Dec. 6, 1955  H. B. TOBIAS  2,725,708
GRASS EDGE TRIMMER
Filed Oct. 16, 1952
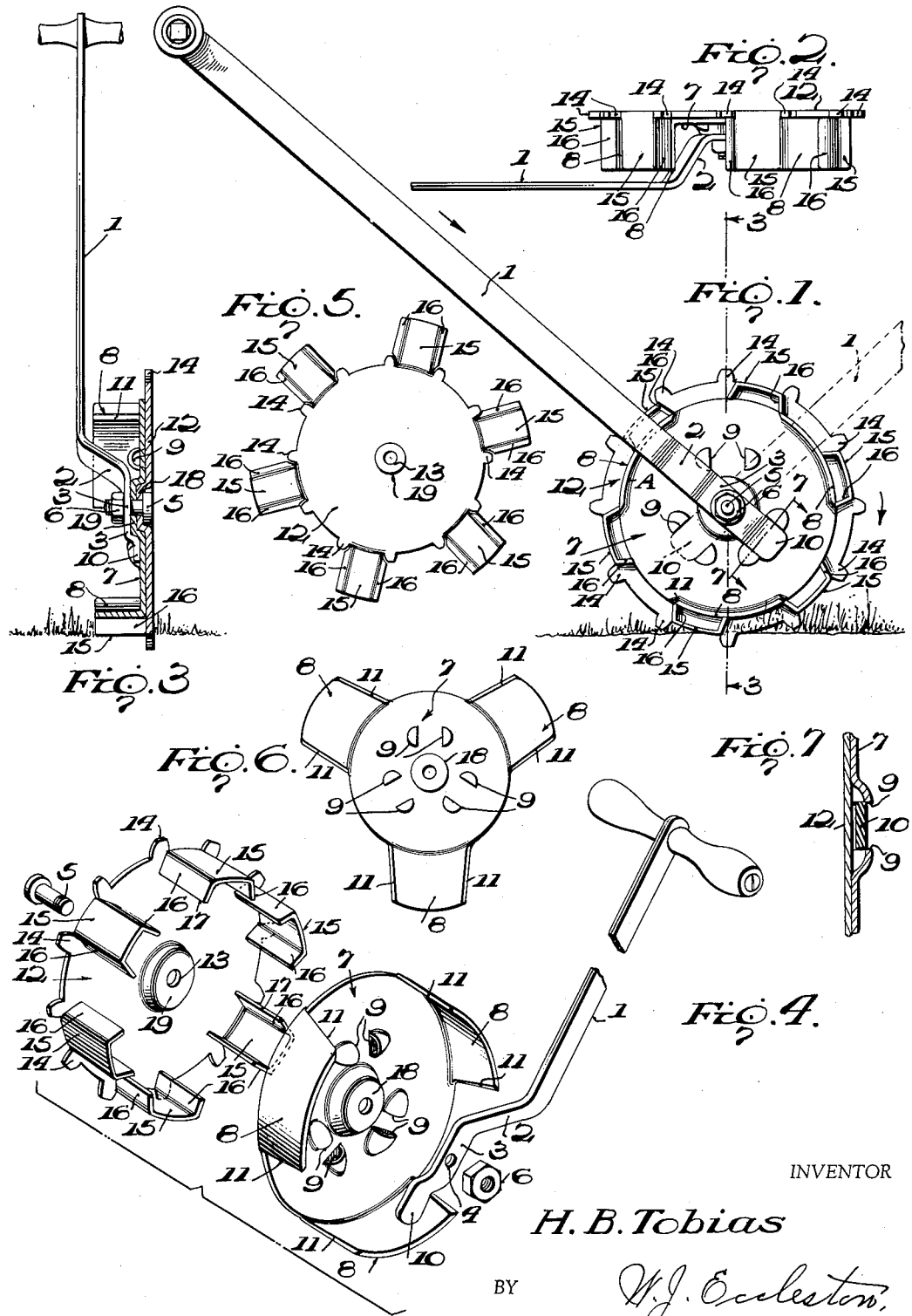
INVENTOR
H. B. Tobias
BY
ATTORNEY

United States Patent Office 2,725,708
Patented Dec. 6, 1955

2,725,708

GRASS EDGE TRIMMER

Herrmann B. Tobias, Washington, D. C.

Application October 16, 1952, Serial No. 315,219

1 Claim. (Cl. 56—256)

(Granted under Title 35, U. S. Code (1952), sec. 266)

The invention described herein, if patented, may be manufactured and used by or for the Government for governmental purposes, without the payment to me of any royalty thereon.

This invention relates to grass cutters and particularly to a grass cutter which is so constructed as to facilitate the cutting of grass at the edge of a lawn, close to a wall, fence, sidewalk, or the like.

A primary object of the invention consists in the provision of an extremely light, single wheel mower which may be stamped from sheet metal and consequently can be produced at a relatively low cost.

Another object of the invention resides in the provision of a lawn trimmer having double-edged movable blades and a double-edged fixed blade whereby the device is capable of cutting grass when moving both forward and backward.

A further object of the invention consists in the provision of a lawn mower having a pair of double-edged blades spaced about an arc and fixed with respect to an operating handle, and double-edged movable blades for selective cooperation with the fixed blades in cutting grass, depending upon the position of the handle.

Other objects and advantages of the invention will be apparent from the following description when taken in connection with the accompanying drawings, in which, Figure 1 is a side elevation of the novel edge trimmer showing in dotted lines a second position for the handle portion of the trimmer;

Figure 2 is a plan view of the trimmer with a portion of the handle broken away;

Figure 3 is a vertical sectional view of the trimmer taken on line 3—3 of Figure 1;

Figure 4 is an exploded view showing the several elements of the grass edge trimmer in perspective prior to assemblage;

Figure 5 is a plan view of stamping for the rotatable disk cutter prior to bending the blades into their final position;

Figure 6 is a plan view of the fixed disk and fixed cutter blades prior to the bending of the cutter blades into their final position; and, Figure 7 is an enlarged detailed sectional view taken on line 7—7 of Figure 1.

Referring to the drawings in more detail, the numeral 1 indicates the handle portion of the grass trimmer and is provided with an offset portion 2 terminating in a straight portion 3 provided with an aperture 4 for reception of a bolt 5 which serves as a shaft for the rotary cutter to be later described. The bolt is held in its position on the flat portion 3 of the handle by means of a nut 6.

Mounted on the bolt or axle 5 is a plate 7 of disk-like form stamped from sheet metal and provided with three radially extending portions 8 as indicated in Figure 6. This disk member 7 is fixed with respect to the handle portion 1 by means of nibs or tangs 9 which are struck up from the body portion of the disk in pairs, there being three such pairs corresponding to the three extensions 8 of the disk 7. These tangs 9 are adapted to be bent up into a vertical position with respect to the body 7 as indicated in the several figures of the drawing. The tangs 9 of each pair are spaced apart a distance corresponding to the width of the extension 10 of the handle portion and consequently serve to fix the disk 7 with respect to the handle portion 1. By viewing Figure 6 of the drawing it will be noted that the sides 11 of each extension 8 are slightly inclined, the purpose being to provide a shearing action when these cutting edges of the blades coact with the rotary blades to be later described. From the position shown in Figure 6 the members 8 are each bent through an angle of 90° to extend laterally from the body 7 of the disk as indicated in Figure 4 and the edges 11 are sharpened to provide the three double-edged blades.

Rotatably mounted on the axle 5 is a disk 12 which in finished form is of slightly larger diameter than the disk 7. This disk 12 is also of sheet metal and is stamped as indicated in Figure 5 to provide a central opening 13, a plurality of ground engaging teeth 14 spaced about the periphery of the disk and, in the present instance, six projections 15 which are bent downwardly through an angle of 90°, as clearly shown in the perspective view of Figure 4, and in turn are provided with downward extensions 16 having sharpened edges 17 providing double-edged blades for cooperation with the fixed double-edged blades 8 formed on the disk 7. The fixed disk 7 and the rotatable disk 12 are provided with centrally disposed depressions 18 and 19, respectively, whereby the disks are centered with respect to each other and the circular depression 19 provides a suitable bearing for the rotatable disk 12.

While three fixed double-edged blades 8 are shown, it is only necessary that two be provided as will appear hereinafter, and the third blade is provided merely for balance, although it will be understood that, if desirable, the handle portion could be separated from the disk 7 and re-positioned so as to bring a third blade into cooperation with the rotary cutter as will appear from the following description of the operation of the grass trimmer.

In the operation of the device, as clearly indicated in Figure 1 of the drawings, the grass trimmer is arranged for being pushed to the right and a fixed blade 8 is disposed at the bottom of the apparatus for cooperation with the double-edged cutter blades 15 as the disk 12 rotates in a clockwise direction. It will be noted also that if the trimmer is drawn backwardly, that is to the left, Figure 1, the rotary disk 12 will rotate in a counter-clockwise direction, but, nevertheless, due to the coaction of the double-edged blades on the two disks 7 and 12 the cutting operation will be performed in just as efficient a manner as in the opposite direction of rotation.

If it is desired to push the trimmer in the opposite direction, that is toward the left, Figure 1, then the handle portion 1 is moved to the dotted line position, Figure 1, and in this movement of the handle portion the other fixed blade 8 is moved through approximately 90° to bring it into position at the bottom of the trimmer for cooperation with the rotary cutter. The third blade of the disk 7 which is indicated by the reference character A in Figure 1 will not be effective except for balance, in either one of the operations just referred to. It should be noted, however, that if one of the blades 8—8 should be dull or ineffective for any other reason, the blade A could be brought into operative position by changing the position of the handle portion 1 with respect to the disk 7 by merely removing the nut 6 so as to disengage the projection 10 from its pair of tangs 9 and shifting it to another pair of tangs as will be readily understood.

From the foregoing description and the accompanying drawings it will be apparent to those skilled in the art that I have provided an exceedingly simple, yet durable structure for trimming the edges of lawns, that by reason of the fact that the essential parts may be struck up from sheet metal the mechanism is relatively inexpensive, that due to the double-edge arrangement of both the movable and fixed blades the trimmer will cut the grass when moved either forwardly or backwardly; and that by reason of the employment of at least a pair of fixed blades 8 the trimmer may be pushed in either of two opposed directions by merely swinging the handle portion 1 in one direction or the other.

In accordance with the patent statutes I have described what I now consider to be the preferred form of construction, but inasmuch as various minor changes may be made without departing from the spirit of the invention it is intended that all such changes be included within the scope of the appended claim.

Having described my invention, I claim:

A grass edge trimmer comprising a handle portion, an axle on one end thereof, two disks on said axle, three pairs of tangs uniformly spaced about one of said disks, the tangs of each pair being spaced apart a distance approximating the width of the handle, said handle having a portion selectively positionable between the tangs of any pair, whereby the disk having the tangs is fixed against rotation, three blades uniformly spaced about the fixed disk, and a plurality of blades on the other disk for cooperation with the blades on the fixed disk.

References Cited in the file of this patent

UNITED STATES PATENTS

| | | |
|---|---|---|
| 2,212,057 | Waller | Aug. 20, 1940 |
| 2,478,587 | La Bonte | Aug. 9, 1949 |